No. 863,261. PATENTED AUG. 13, 1907.
E. T. CHARMON.
COMBINED VEHICLE AND BOAT.
APPLICATION FILED JAN. 4, 1906. RENEWED FEB. 19, 1907.

2 SHEETS—SHEET 1.

Witnesses
C. K. Reichenbach.
J. C. Jones

Inventor
E. T. Charmon
By Chandler & Chandler
Attorneys.

No. 863,261. PATENTED AUG. 13, 1907.
E. T. CHARMON.
COMBINED VEHICLE AND BOAT.
APPLICATION FILED JAN. 4, 1906. RENEWED FEB. 19, 1907.

2 SHEETS—SHEET 2.

Witnesses
C. K. Reichenbach.
F. C. Jones.

Inventor
E T Charmon
by Chandlee & Chandlee
Attorneys

UNITED STATES PATENT OFFICE.

EDWARD T. CHARMON, OF HANNIBAL, MISSOURI.

COMBINED VEHICLE AND BOAT.

No. 863,261.   Specification of Letters Patent.   Patented Aug. 13, 1907.

Application filed January 4, 1906, Serial No. 294,652. Renewed February 19, 1907. Serial No. 358,242.

*To all whom it may concern:*

Be it known that I, EDWARD T. CHARMON, a citizen of the United States, residing at Hannibal, in the county of Marion, State of Missouri, have invented certain new and useful Improvements in a Combined Vehicle and Boat; and I do hereby declare the following to be a full, clear, and exact description of the invention, such as will enable others skilled in the art to which it appertains to make and use the same.

This invention relates to combined vehicles and boats and has for its object to provide a device of this character which will be adapted to travel upon land, water, or upon railroad rails.

A further object of the invention is to provide a simple device of this character which shall be efficient in action.

Figure 1:
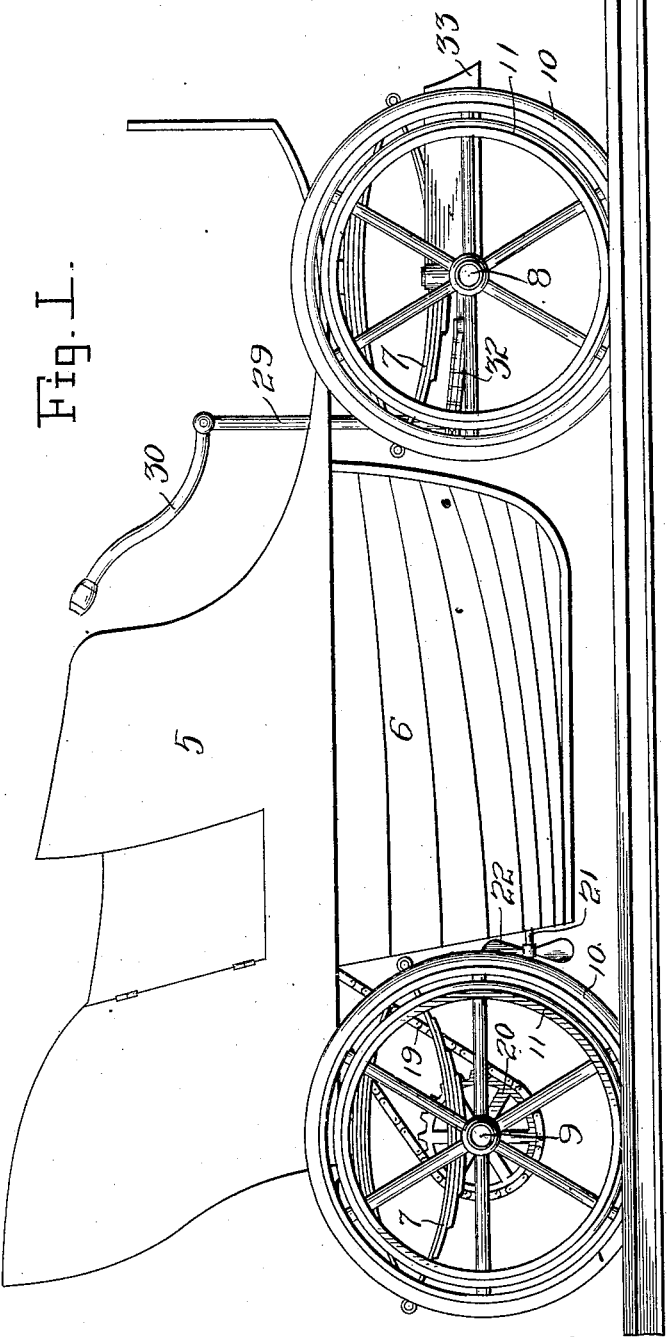
Figure 2:
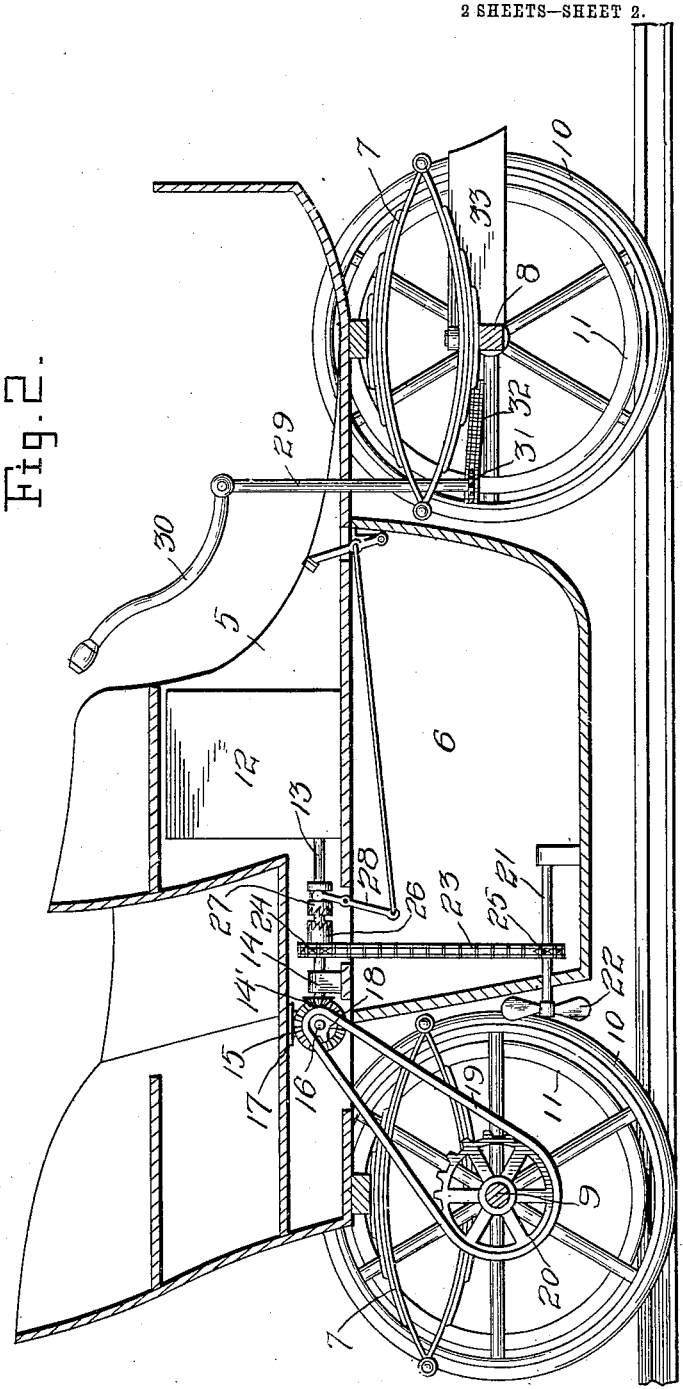

In the accompanying drawings: Figure 1 is a side elevation of the invention. Fig. 2 is a central vertical longitudinal sectional view through the device.

Referring to the accompanying drawings, the numeral 5 denotes the vehicle body of my invention and 6 the hull of the boat portion of the same. The vehicle body 5 is mounted by means of springs 7 upon front and rear axles 8 and 9 respectively, the said axles being provided with the usual wheels 10.

Secured to the spokes of the wheels 10 are flanged wheels 11 which are arranged to run upon the rails of a railroad, and which are disposed outwardly of the wheels 10 so that the said wheels 10 lie between the said rails when the invention is being used upon a railroad.

Mounted upon the body of the vehicle is an engine 12 which may be of any desired construction and which includes the usual engine-shaft 13 which is mounted in suitable brackets 14 which are secured to the said vehicle body. At its opposite end to the engine, the shaft 13 is provided with a bevel-gear 14′ which is in mesh with a bevel-gear 15 upon a shaft 16. The shaft 16 is journaled in suitable brackets 17 and extends transversely of the vehicle body. Mounted upon the shaft 16 adjacent one of its ends is a sprocket-gear 18 over which is engaged a sprocket-chain 19 which is engaged over a second sprocket-gear 20 on the rear axle 9 of the machine.

Mounted in the hull 6 in parallel relation with the shaft 13 is a shaft 21 which is provided at its rear end and in rear of the said hull with a propeller 22, a chain 23 being engaged over sprocket-gears 24 and 25 upon the shafts 13 and 21 respectively, whereby the shaft 21 may be rotated when desired. The sprocket gear 24 carries one member 26 of a clutch, the other member 27 of the clutch being slidably engaged upon the shaft 13, a lever 28 being arranged to move the member 27 out of engagement with the member 26 when the machine is running upon land.

A steering-shaft 29 is mounted vertically in the forward part of the vehicle body 5 and is provided at its upper end with a handle 30 and at its lower end with a sprocket-gear 31 with which is engaged a chain 32, the said chain having its end connected to the front axle 8 inwardly of the wheels 10. It will thus be seen that by turning the handle 30 and consequently the shaft 29, the chain 32 will be acted upon in such a manner as to turn the axle 8 as desired.

Secured at their rear ends to the front axle 8 and adjacent the wheels 10 are rudder-blades 33 which serve to steer the machine during its passage through a body of water.

What is claimed is:

1. A machine of the class described comprising a vehicle body, a boat body, wheels supporting said bodies, and flanged supplemental wheels carried by said first-named wheels.

2. A machine of the class described comprising a vehicle body and boat body, wheeled axles supporting said bodies, one of said axles being mounted for turning movement and a rudder blade carried by the movable axles.

3. A machine of the class described comprising a vehicle body, a boat body, wheeled axles supporting said bodies, and rudder blades carried by one of said axles.

In testimony whereof, I affix my signature, in presence of two witnesses.

EDDIE T. CHARMON.

Witnesses:
C. V. HELTON,
W. T. HALL.